United States Patent
Lisec

[19]

[11] Patent Number: 5,815,273
[45] Date of Patent: Sep. 29, 1998

[54] DEVICE TO DETERMINE THE SHAPE OF PANE-SHAPED OBJECTS

[76] Inventor: Peter Lisec, Bahnhofstrasse 34, A-3363 Amstetten-Hausmening, Austria

[21] Appl. No.: 736,013

[22] Filed: Oct. 23, 1996

[30] Foreign Application Priority Data

Oct. 23, 1995 [AT] Austria ................................ 1753/95

[51] Int. Cl.$^6$ .................................................. G01B 11/24
[52] U.S. Cl. .......................................... 356/376; 356/385
[58] Field of Search ................................... 356/372, 376, 356/383, 385; 250/559.22, 559.24, 559.26

[56] References Cited

U.S. PATENT DOCUMENTS

| | | | |
|---|---|---|---|
| 3,566,135 | 2/1971 | Mouchart | 250/559.26 |
| 3,724,958 | 4/1973 | Callan | 250/559.24 |
| 4,120,403 | 10/1978 | Stephanos | 250/559.24 |
| 4,192,613 | 3/1980 | Hammar | 356/386 |
| 4,459,487 | 7/1984 | Leser | 250/559.22 |
| 4,912,337 | 3/1990 | Wilwerding | 250/559.24 |
| 5,326,311 | 7/1994 | Persoon et al. | 356/376 |
| 5,373,363 | 12/1994 | Kobayashi | 356/383 |
| 5,448,078 | 9/1995 | Nakazawa | 250/559.24 |

FOREIGN PATENT DOCUMENTS

| | | |
|---|---|---|
| 0 108 470 | 5/1984 | European Pat. Off. . |
| 2 161 664 | 7/1973 | France . |
| 40 34 398 | 4/1992 | Germany . |

OTHER PUBLICATIONS

German Book: C. Reuber (Publ.): Handbook of Information Technology and Electronics, vol. 8: Sensors and Converter Components, Huethig Verlag, Heidelberg, 1989, pp. 171–174. (no month).

*Primary Examiner*—Richard A. Rosenberger
*Attorney, Agent, or Firm*—Young & Thompson

[57] ABSTRACT

A device for determining the shape of pane-shaped objects (1), particularly thermal window panes, has a support device which a pane-shaped object (1) abuts, optical sensors (7), a conveyor device (4, 5, 6) to move a pane-shaped object (1) and optical sensors (7) relative to one another, and a device for determining the travel path. There are multiple optical sensors (7) which are arranged in at least one row (3), where this row (3) is oriented parallel to the plane of pane-shaped object (1), as well as at an angle to the direction of travel (X). Optical sensors (7) which are arranged in one row (3) are reflected-light barriers. Light rays are reflected in the area of an object (1) (up to the edge of the object (9)) but not past to it, so that the Y-coordinate of a point on the object (9) is determined by the transition from reflection to non-reflection at sensor (7).

16 Claims, 1 Drawing Sheet

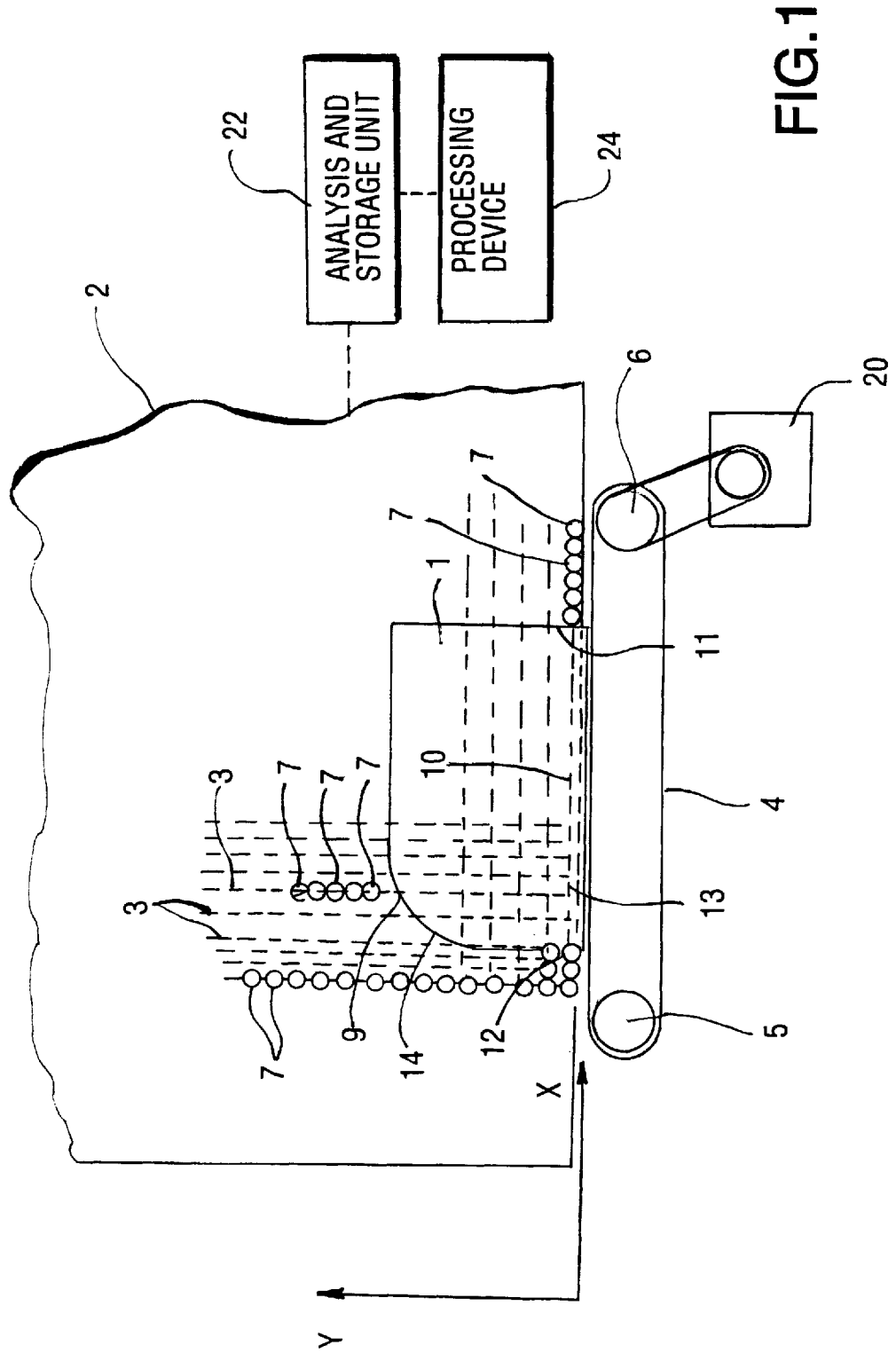

DEVICE TO DETERMINE THE SHAPE OF PANE-SHAPED OBJECTS

BACKGROUND OF THE INVENTION

The invention relates to a device for determining the shape of pane-shaped objects, particularly thermal window panes.

This type of device can be integrated into a device of practically any design with which pane-shaped objects, particularly thermal window panes, are transported. For instance, the device can be a conveyor device by which thermal window panes are transported to a sealing device.

Particularly in the case of objects that are not rectangular or square, and especially thermal window panes, the shape of the contour needs to be determined precisely so that the devices for subsequent processing procedures, for example a device for sealing the edge joints of thermal window panes, can be controlled accordingly. A device that makes this possible is known from, for instance, DE-40-33 585 A.

However, the device described in DE 40 33 585 A has the disadvantage that two line cameras must be provided when the dimensions of the objects are large in order to capture the contour and that the line cameras are sensitive to disruptive external light influences. In addition, good line cameras are expensive.

SUMMARY OF THE INVENTION

The object of the present invention is to indicate a device of the type mentioned above that operates quickly and reliably and is inexpensive to produce.

This object is achieved according to the invention by providing multiple optical sensors that are arranged in at least one row and by orienting this row parallel to the plane of the pane-shaped object, as well as at an angle to the direction of travel.

With the present invention, the Y coordinates, i.e., the coordinates normal to the direction of travel X, of the edge points of a pane-shaped object such as a thermal window pane can be simply and continuously determined by having the optical sensors, which are arranged in one row at an angle to the direction of travel, determine the point up to which the window pane extends in the Y direction. The corresponding X coordinates of the edge points are determined by, for example, a motion pickup that is associated with the conveyor device so that the entire external contour of the pane-shaped object, for instance a thermal window pane, can be determined in a single pass in which the pane-shaped object is moved past the row of optical sensors.

Additional characteristics and advantages of the invention will be apparent from the following description of embodiments of the invention with reference to the drawing.

BRIEF DESCRIPTION OF THE DRAWING

The FIGURE illustrates an embodiment of the invention.

DESCRIPTION OF THE PREFERRED EMBODIMENTS

In the drawing a device according to the invention is schematically shown that consists essentially of a support device 2 and a conveyor device, for example a conveyor belt 4 or a row of transport rollers. Support device 2 is, as is basically known, a support wall, which is tilted 5 degrees to 8 degrees to the rear and which the pane-shaped object, for example any window pane 1, especially a thermal window pane, abuts. Conveyor belts or transport rollers, which may also be motor-driven, can be integrated into the support wall. Air-cushion walls may also be used as a support device.

In another embodiment support device 2 is a horizontal (air cushion-) table on which the window pane 1 lies horizontally and is moved by transport rollers or conveyor belts in the direction of arrow X.

In the embodiment shown in the drawing, window pane 1 stands with its bottom edge on conveyor belt 4, which runs over deflection rollers 5, 6 and is driven by, for example, deflection roller 6. A motion pickup 20, which is used in one embodiment to determine the X coordinates of edge points 9, 11, 12 of the window pane, is connected to conveyor belt 4, a deflection roller 5, 6, or the drive of conveyor belt 4. In support device 2 are optical sensors 7 which are used to determine the Y coordinates of edge points 9, 11, 12 of window pane 1. Said sensors 7, which are, for example, reflected-light barriers, are arranged in one row 3, which is oriented parallel to the plane of movement of window pane 1 and at right angles to direction of travel X.

The X and Y coordinates of edge point 9 of window pane 1 can be determined with the device according to the invention as follows. The light rays of the reflected-light barriers of all sensors 7 which are arranged between bottom end 13 of row 3 and edge point 9 of window pane 1 are reflected. Those sensors 7 which lie above edge point 9 are not activated since the light rays of their reflected-light barriers are not reflected. The Y coordinate of edge point 9 is determined from the transition from reflection to non-reflection (highest reflected light barrier/lowest non-reflected reflected-light barrier). The corresponding X coordinate of edge point 9 is determined, for example, in that as glass pane 1 advances, the measurement of the X coordinate by motion pickup 20 is triggered by the light of the reflected-light barriers of sensors 7 in row 3 being reflected by the leading edge of glass pane 1 and the X coordinate up to edge point 9 then being determined by the feed path being measured by motion pickup 20. Measurement data may be analyzed and stored in an analysis and storage unit 22 and subsequently processed in a processing device 24.

Alternatively, instead of motion pickup 20, which is associated with conveyor belt 4, a second row 10 of optical sensors 7, for instance reflected-light barriers, is provided which is oriented in direction of travel X. In this case the X-coordinate of edge point 9 can also be determined by determining the distance in the X direction between edge point 9 in row 3 of sensors 7 and edge point 11 and/or 12, which triggers a constantly changing measurement signal in row 10 of sensors 7 as glass pane 1 is moved in the X direction.

Changes in the embodiments shown in the sketch are possible within the framework of the invention. Thus, for instance, row 3 of sensors 7 can be oriented at an angle of greater or less than 90 degrees to direction of travel X. A motion pickup which is associated with conveyor belt 4 can also be combined with a row 10 of sensors 7, which is oriented parallel to the direction of travel.

In addition, instead of using reflected-light barriers as sensors 7, regular light barriers can be used, with which glass pane 1 can be moved between opposing rows of optical sensors and optical receivers.

In another embodiment glass pane 1 remains stationary and a beam in which row 3 of optical sensors 7 is arranged is moved past the glass pane.

It is also possible to provide numerous rows 3 and/or 10 of optical sensors 7, in which lowest sensors 7 in each row 3 together form row 10 of sensors 7, which is parallel to the direction of travel. An advantage here is that sensors 7 are arranged so that they are spread over supporting device 2, for example the air-cushion wall. As an example, sensors 7 are arranged in multiple parallel rows 3 and/or 10, equidistant from each other in each row 3 and/or 10.

Since it is technically impossible or difficult to arrange sensors 7 next to each other at a theoretical distance of 0 and this is also not economically feasible, discontinuities in the measurement data occur in the area of curved segment 14 of the outer contour when, for instance, the contour of glass pane 1 shown in the sketch is determined. However, the curve can be easily smoothed mathematically. It is also possible to arrange two or more rows of offset optical sensors 7 next to each other in order to improve the accuracy of measurement.

Optical sensors 7 can also be arranged in row 3 (vertically to direction of travel X) and/or in row 10 (parallel to travel direction X) in two rows located right next to one another where sensors 7 of one row are arranged with a gap between sensors 7 and the neighboring row. Thus the distance between sensors 7 of one row and the next, which is necessitated by the manufacturing process, is reduced.

In summary, an embodiment of the invention can be depicted as follows:

A device for determining the shape of pane-shaped objects, particularly thermal glass panes, has a support device which the pane-shaped object abuts, optical sensors, a conveyance device to move the pane-shaped object and the optical sensors relative to each other, and a device for determining the feed path. There are multiple optical sensors which are arranged in at least one row, where this row is oriented parallel to the plane of the pane-shaped object, as well as at an angle to the direction of travel (X). The optical sensors arranged in one row are preferably reflected-light barriers. Light rays are reflected in the area of the object (up to its edge) but not past to it, so that the Y coordinate of the point is determined from the transition from reflection to non-reflection at the reflected-light barrier.

What is claimed is:

1. Device for determining a contour of a pane-shaped object comprising:
    a planar wall tilted relative to vertical and an adjacent generally horizontal base for supporting a side of the pane-shaped object having a planar surface parallel to said tilted wall;
    at least one row of plural optical sensors (7),
    means for moving pane-shaped object (1) and said optical sensors (7) relative to one another,
    a device (20) to determine a distance of relative movement of the pane-shaped object,
    wherein said row of optical sensors is oriented parallel to a plane of the pane-shaped object (1) and to said tilted wall, and not parallel to a direction of relative travel of the pane-shaped object and not parallel to said base.

2. The device according to claim 1, wherein said row of optical sensors is oriented at right angles to the direction of travel of the pane-shaped object.

3. The device according to claim 1, wherein said row of optical sensors is originated oblique to the direction of travel of the pane-shaped sensors.

4. The device according to claim 1, wherein said means for moving is a conveyor device.

5. The device according to claim 4, wherein said device to determine a distance of relative movement is associated with said conveyor device.

6. The device according to claim 4, wherein sensors (7) are spread over the entire surface of a support device (2) which extends upward from said conveyor device (4), and along which pane-shaped objects (1) are moved.

7. The device according to claim 6, wherein optical sensors (7) are spread evenly over said support device (2).

8. The device according to claim 1, wherein the device to determine a distance of relative movement is a row (10) of optical sensors (7), which extends in the direction of travel of the pane-shaded object.

9. The device according to claim 1, wherein said optical sensors (7) are reflected-light barriers.

10. The device according to claim 1, further comprising an analysis and storage unit.

11. The device according to claim 10, further comprising a processing device for receiving data from said analysis and storage unit.

12. The device of claim 1, comprising at least two said rows of optical sensors that are parallel and staggered so that each of said sensors senses passage of a different portion of the edge of the planar object.

13. A device for determining a contour of a pane-shaped object, comprising:
    plural rows of plural optical sensors;
    a conveyor for moving the pane-shaped object and said optical sensors relative to one another; and
    a device for determining a distance of relative movement of the pane-shaped object,
    wherein said rows of optical sensors are oriented parallel to a plane of the pane-shaped object and not parallel to a direction of relative travel of the pane-shaped object, and
    wherein the ones of said sensors that are arranged generally parallel to a direction of travel of the pane-shaped object form a line (10) of sensors (7) for determining the direction of travel of the pane-shaped object.

14. A device for determining a contour of a planar object, comprising:
    a planar wall tilted relative to vertical and an adjacent generally horizontal base for supporting a side of a planar object having its planar surface parallel to said tilted wall;
    at least one row of optical sensors parallel to said tilted wall and not parallel to said base, each of said sensors for sensing passage of a portion of an edge of the planar object;
    means for moving the planar object relative to said row of optical sensors; and
    a movement sensor connected to said means for moving, for determining a distance of movement of the planar object relative to said row of optical sensors, whereby said row of optical sensors and said movement sensor determine a contour of the planar object.

15. The device of claim 14, comprising at least two said rows of optical sensors that are parallel and staggered so that each of said sensors senses passage of a different portion of the edge of the planar object.

16. The device of claim 14, wherein said movement sensor comprises a further row of optical sensors that are parallel to said base and perpendicular to said at least one row of optical sensors.

* * * * *